(12) United States Patent  
Shirakabe et al.

(10) Patent No.: US 9,241,306 B2  
(45) Date of Patent: Jan. 19, 2016

(54) RADIO COMMUNICATION SYSTEM, MOBILE STATION, BASE STATION, AND COMMUNICATION CONTROL METHOD

(71) Applicant: NTT DOCOMO, INC., Chiyoda-ku (JP)

(72) Inventors: Masashige Shirakabe, Chiyoda-ku (JP); Akihito Morimoto, Chiyoda-ku (JP); Nobuhiko Miki, Chiyoda-ku (JP); Satoshi Nagata, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 72 days.

(21) Appl. No.: 14/353,880

(22) PCT Filed: Nov. 15, 2012

(86) PCT No.: PCT/JP2012/079645  
§ 371 (c)(1),  
(2) Date: Apr. 24, 2014

(87) PCT Pub. No.: WO2013/077246  
PCT Pub. Date: May 30, 2013

(65) Prior Publication Data  
US 2014/0293878 A1    Oct. 2, 2014

(30) Foreign Application Priority Data

Nov. 24, 2011    (JP) ................. 2011-255902

(51) Int. Cl.  
*H04W 36/04* (2009.01)  
*H04W 16/32* (2009.01)  
*H04W 48/20* (2009.01)  
*H04W 84/04* (2009.01)

(52) U.S. Cl.  
CPC ............ *H04W 48/20* (2013.01); *H04W 84/045* (2013.01)

(58) Field of Classification Search  
None  
See application file for complete search history.

(56) References Cited

U.S. PATENT DOCUMENTS

| | | | |
|---|---|---|---|
| 6,044,272 | A | 3/2000 | Kobylinski et al. |
| 6,694,138 | B1 | 2/2004 | Kobylinski et al. |
| 7,142,861 | B2 | 11/2006 | Murai |
| 2004/0048616 | A1 | 3/2004 | Kobylinski et al. |
| 2006/0189316 | A1 | 8/2006 | Kobylinski et al. |

FOREIGN PATENT DOCUMENTS

JP    2007-514367    5/2007

OTHER PUBLICATIONS

International Search Report issued Jan. 29, 2013, in PCT/JP2012/079645, filed Nov. 15, 2012.

(Continued)

*Primary Examiner* — Kevin C Harper  
*Assistant Examiner* — Derrick V Rose  
(74) *Attorney, Agent, or Firm* — Oblon, McClelland, Maier & Neustadt, L.L.P.

(57) ABSTRACT

A radio communication system includes multiple base stations including a first base station and a second base station, and a mobile station. A candidate base station selector selects multiple candidate base stations that are candidates for a radio access point for the mobile station on the basis of the reception powers reported by the mobile station. When the mobile station actually executes wireless communication with the base station, an access-point base station determiner determines, as an access-point base station that is the actual radio access point for the mobile station, a base station corresponding to a best reception quality among reception qualities measured in the protected resource and reception quality measured in the non-protected resource.

9 Claims, 9 Drawing Sheets

(56) References Cited

OTHER PUBLICATIONS

Extended European Search Report issued Jul. 3, 2015 in Patent Application No. 12851297.7.

Masashige Shirakabe, et al., "Performance Evaluation of Inter-cell Interference Coordination and Cell Range Expansion in Heterogeneous Networks for LTE-Advanced Downlink" 2011 $8^{th}$ International Symposium on Wireless Communication Systems, XP032090014, 2011, pp. 844-848.

RADIO COMMUNICATION SYSTEM, MOBILE STATION, BASE STATION, AND COMMUNICATION CONTROL METHOD

FIELD OF THE INVENTION

The present invention relates to a radio communication system, a mobile station, a base station, and to a communication control method.

BACKGROUND ART

Recently, a heterogeneous network (sometimes abbreviated "HetNet") is proposed in which multiple types of radio base stations (macro base stations, pico base stations, femto base stations, remote radio heads, etc.) having different radio capabilities, are deployed in a multi-layered way. In a heterogeneous network, base stations having a higher radio capability (the maximum transmission power, average transmission power, etc.), e.g., macro base stations are likely to be selected as the radio access points in accordance with reception power at the stage of cell search or handover in comparison with other base stations having a lower radio capability, e.g., pico base stations. Accordingly, connections of mobile stations are concentrated on base stations with higher radio capability, and thus, there is a tendency for excessive communication load at base stations with higher radio capability.

In order to solve the problem, for example, Patent Document 1 discloses a technology for controlling to change communication cell boundaries by changing an offset value (bias value) that is used for numerically reducing the power level received at mobile stations, according to parameters, such as the load of the radio communication system and the amount of traffic. The mobile station in Patent Document 1 selects its serving base station (a macro cell base station or a micro cell base station) on the basis of the offset power level (reception power).

RELATED ART DOCUMENTS

Patent Documents

Patent Document 1: JP-A-2007-514367

SUMMARY OF THE INVENTION

In the structure of Patent Document 1 in which the power level received at mobile stations is numerically reduced according to parameters, such as the load of the radio communication system and the amount of traffic, the influence of noise power and interference from other radio base stations, etc. (i.e., components other than the desired wave) upon the desired wave is not suitably reflected in selection of the radio access point. In other words, the reception quality at the mobile station is not suitably reflected in selection of the radio access point, and thus the radio access point for the mobile station may not be selected appropriately. On the other hand, since measurements of reception qualities at the mobile station involve a significant processing load, increase in frequency of measurements of reception qualities for selection of the radio access point is questionable from the viewpoint of reducing power consumption of the mobile station.

Accordingly, it is an object of the present invention to select (decide) the radio access point for the mobile station appropriately on the basis of reception quality while restricting increase in power consumption in a radio communication system including multiple types of base stations having different radio capabilities.

According to the present invention, a radio communication system includes: multiple base stations including at least one first base station and at least one second base station of which radio capability is less than that of the first base station; at least one mobile station that executes wireless communication by using at least one of a protected resource in which only the second base station transmits radio signals and a non-protected resource in which both the first base station and the second base station transmit radio signals; a candidate base station selector configured to select candidate base stations that are candidates for a radio access point for the mobile station; and an access-point base station determiner configured to determine an access-point base station that is an actual radio access point for the mobile station. The mobile station includes: a reception power measurer configured to measure reception powers of radio signals received from the multiple base stations; a reception power reporter configured to report the reception powers measured by the reception power measurer to the candidate base station selector. The candidate base station selector is capable of selecting multiple candidate base stations that are candidates for a radio access point for the mobile station on the basis of the reception powers reported by the reception power reporter of the mobile station. The mobile station further includes: a reception quality measurer configured to, before the mobile station actually executes wireless communication with one of the candidate base stations, measure reception qualities of radio signals that are to be used for communication with the multiple candidate base stations selected by the candidate base station selector; and a reception quality reporter configured to report the reception qualities measured by the reception quality measurer to the access-point base station determiner. The access-point base station determiner is configured to determine, as the access-point base station that is the radio access point for the mobile station, a base station corresponding to a best reception quality among the reception qualities of the radio signal used for communication between the second base station and the mobile station in the protected resource measured by the reception quality measurer of the mobile station and the reception quality of the radio signal used for communication between the first base station and the mobile station in the non-protected resource measured by the reception quality measurer of the mobile station.

With such a structure, multiple candidate base stations are selected on the basis of reception powers measured by the mobile station, and before actual wireless communication is executed, a base station having a better reception quality at the mobile station can be determined to be the access-point base station for executing wireless communication among the candidate base stations. Therefore, in comparison with another structure in which the access-point base station is determined simply on the basis of reception power, it is possible to determine a more appropriate base station (that will result in better reception quality) as the radio access point. In addition, the determination of the access-point base station is conducted on the basis of reception qualities before actual wireless communication is executed. Therefore, in comparison with another structure in which reception qualities are always measured and reported, the number of times of measurements and reports of reception qualities at the mobile station can be reduced, and power consumption of the mobile station can be restricted.

In a preferred embodiment of the present invention, the first base station further includes: a bias value setter configured to set a bias value for the mobile station; and a bias value informant configured to transmit the bias value to the mobile station, and the mobile station further includes: a reception power compensator configured to offset the reception power of the radio signal received from the second base station measured by the reception power measurer by increasing the reception power by using the bias value transmitted by the bias value informant of the first base station. The reception power reporter is configured to report, to the candidate base station selector, the reception power offset by the reception power compensator as the reception power from the second base station.

With such a structure, since the reception power of the radio signal received from the second base station is increased by offsetting by the bias value, more mobile stations can execute wireless communication with the second base station. On the other hand, the actual strength of the radio signal is not changed by offsetting with the bias value. Accordingly, at the mobile station that executes wireless communication with the second base station by virtue of offsetting with the bias value, it is likely that the reception power will not correlate with the reception quality. However, with the above structure, since the actual radio access point is determined on the basis of reception qualities, it is possible to select (determine) a more appropriate base station (that will result in better reception quality) for each mobile station although offsetting with the bias value is conducted.

In a preferred embodiment of the present invention, the first base station includes: said candidate base station selector; a candidate base station informant configured to transmit information indicating the multiple candidate base stations selected by the candidate base station selector to the mobile station; said access-point base station determiner; and an access-point base station informant configured to transmit information indicating the access-point base station determined by the access-point base station determiner to the mobile station. The reception quality reporter of the mobile station is configured to average the reception qualities of radio signals from the first base station for a predetermined period, is configured to average the reception qualities of radio signals from the second base station for the predetermined period, and is configured to report the averaged reception qualities to the access-point base station determiner of the first base station at a predetermined cycle.

With such a structure, the first base station selects candidate base stations and determines the access-point base station. Therefore, in comparison with another structure in which the mobile station selects candidate base stations and determines the access-point base station, it is possible to reduce power consumption at the mobile station. In addition, reception qualities averaged over a predetermined period are reported. Therefore, in comparison with another structure in which the reception qualities are reported whenever they are measured, it is possible to reduce the overhead for reporting.

According to the present invention, a mobile station is provided in a radio communication system including: multiple base stations including at least one first base station and at least one second base station of which radio capability is less than that of the first base station; at least one mobile station that executes wireless communication by using at least one of a protected resource in which only the second base station transmits radio signals and a non-protected resource in which both the first base station and the second base station transmit radio signals; a candidate base station selector configured to select candidate base stations that are candidates for a radio access point for the mobile station; and an access-point base station determiner configured to determine an access-point base station that is an actual radio access point for the mobile station. The mobile station includes: a reception power measurer configured to measure reception powers of radio signals received from the multiple base stations; a reception power reporter configured to report the reception powers measured by the reception power measurer to the candidate base station selector; a reception quality measurer configured to, before the mobile station actually executes wireless communication with one of the candidate base stations, measure reception qualities of radio signals that are to be used for communication with the multiple candidate base stations selected by the candidate base station selector; a reception quality reporter configured to report the reception qualities measured by the reception quality measurer to the access-point base station determiner; and said access-point base station determiner configured to determine, as the access-point base station that is the radio access point for the mobile station, a base station corresponding to a best reception quality among the reception qualities of the radio signal used for communication between the second base station and the mobile station in the protected resource measured by the reception quality measurer of the mobile station and the reception quality of the radio signal used for communication between the first base station and the mobile station in the non-protected resource measured by the reception quality measurer of the mobile station.

In a preferred embodiment of the present invention, the mobile station further includes a reception power compensator configured to offset the reception power of the radio signal received from the second base station measured by the reception power measurer by increasing the reception power by using a bias value transmitted by the base station. The reception power reporter is configured to report, to the candidate base station selector, the reception power offset by the reception power compensator as the reception power from the second base station.

According to the present invention, a base station is provided in a radio communication system including: multiple base stations including at least one first base station and at least one second base station of which radio capability is less than that of the first base station; and at least one mobile station that executes wireless communication by using at least one of a protected resource in which only the second base station transmits radio signals and a non-protected resource in which both the first base station and the second base station transmit radio signals. The base station includes: a candidate base station selector configured to select multiple candidate base stations that are candidates for a radio access point for the mobile station on the basis of reception powers of radio signals received by the mobile station from the multiple base stations and reported by the mobile station; and an access-point base station determiner configured to, before the base station actually executes wireless communication with the mobile station, determine a base station corresponding to a best reception quality among the reception qualities of the radio signal that is to be used for communication between the second base station and the mobile station in the protected resource measured by the mobile station and the reception quality of the radio signal that is to be used for communication between the first base station and the mobile station in the non-protected resource measured by the mobile station, as an access-point base station that is an actual radio access point for the mobile station.

In a preferred embodiment of the present invention, the base station further includes: a bias value setter configured to set a bias value, the bias value being to be used by the mobile station for offsetting to increase the reception power of the radio signal received from the second base station measured by the mobile station; and a bias value informant configured to transmit the bias value to the mobile station.

According to the present invention, a communication control method is used in a radio communication system including: multiple base stations including at least one first base station and at least one second base station of which radio capability is less than that of the first base station; and at least one mobile station that executes wireless communication by using at least one of a protected resource in which only the second base station transmits radio signals and a non-protected resource in which both the first base station and the second base station transmit radio signals. The communication control method includes: measuring, at the mobile station, reception powers of radio signals received from the multiple base stations; reporting, from the mobile station, the reception powers measured by the mobile station to a candidate base station selector; selecting, at the candidate base station selector, multiple candidate base stations that are candidates for a radio access point for the mobile station on the basis of the reception powers reported by the mobile station; measuring, at the mobile station, reception qualities of radio signals that are to be used for communication with the multiple candidate base stations selected by the candidate base station selector before the mobile station actually executes wireless communication with one of the candidate base stations; reporting, at the mobile station, the reception qualities measured by the mobile station to an access-point base station determiner; and determining, at the access-point base station determiner, as the access-point base station that is an actual radio access point for the mobile station, a base station corresponding to a best reception quality among the reception qualities of the radio signal used for communication between the second base station and the mobile station in the protected resource measured by the mobile station and the reception quality of the radio signal used for communication between the first base station and the mobile station in the non-protected resource measured by the mobile station.

In a preferred embodiment of the present invention, the communication control method further includes: setting, at the base station, a bias value for the mobile station; transmitting, from the base station, the bias value to the mobile station; offsetting, at the mobile station, the reception power of the radio signal received from the second base station measured by the mobile station by increasing the reception power by using the bias value transmitted from the base station; and reporting from the mobile station to the candidate base station selector, the reception power offset by the mobile station as the reception power from the second base station.

DESCRIPTION OF EMBODIMENTS (1) Outline of Radio Communication System

Figure 1:
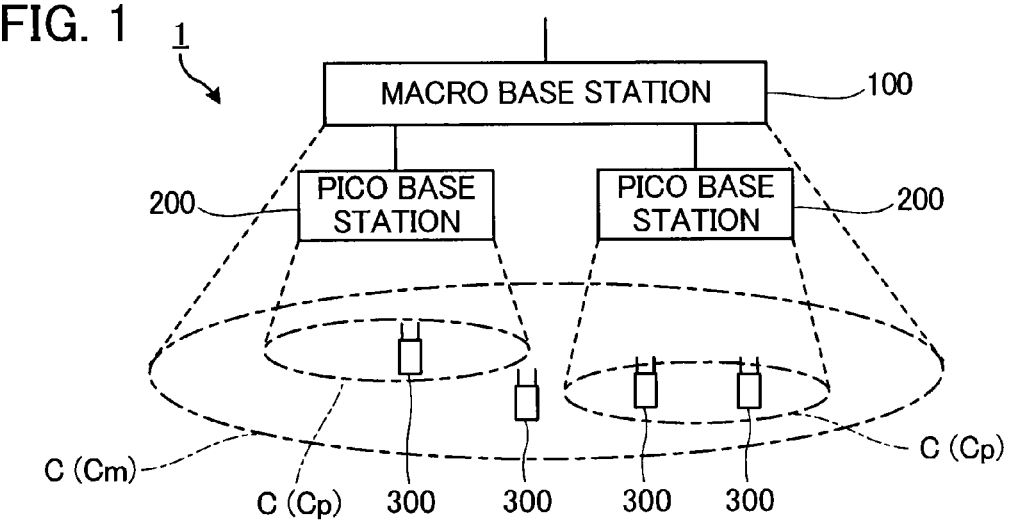
FIG. 1 is a block diagram showing a radio communication system according to an embodiment of the present invention.

FIG. 1 is a block diagram of a radio communication system 1 according to an embodiment of the present invention. The radio communication system 1 includes macro base stations (macro eNodeB (evolved Node B)) 100, pico base stations (pico eNodeBs) 200, and mobile stations (user terminals or user equipments) 300. For the purpose of facilitating description, only one macro base station 100 is illustrated, but it will be appreciated that the radio communication system 1 may include multiple macro base stations 100.

Communication elements in the radio communication system 1 (the macro base stations 100, the pico base stations 200, the mobile stations 300, etc.) conduct radio communication in compliance with a predetermined radio access technology, e.g., LTE (Long Term Evolution). In this embodiment, the radio communication system 1 operates in compliance with LTE, but it is not intended to limit the technical scope of the present invention. It will be appreciated that the present invention can be used with other radio access technologies such as, for example, WiMAX (Worldwide Interoperability for Microwave Access) stipulated in IEEE 802.16-2004 and IEEE 802.16e with necessary design modifications.

The macro base station 100 is connected to the pico base stations 200 via radio or cable (for example, X2 interface or optical fibers). The macro base station 100 forms a macro cell Cm therearound, whereas each pico base station 200 forms a pico-cell Cp therearound. Each pico-cell Cp may be formed within a macro cell Cm formed by the macro base station 100 to which the pico base station 200 that forms the pico-cell Cp is connected. Multiple pico-cell Cp may be formed within a single macro cell Cm.

Each of the base stations (the macro base station 100 and the pico base stations 200) can perform radio communication with user mobile stations 300 visiting the cell C (Cm or Cp) formed by the base station itself. In other words, each mobile station 300 can perform radio communication with one or more base stations (the macro base station 100 and one of the pico base stations 200 if any) corresponding to one or more cells C (the macro cell Cm and one of the pico-cells Cp if any) where the mobile station 300 itself is visiting.

Since the pico-cells Cp are formed in a multi-layered way (i.e., overlaid) inside the macro cell Cm, when the mobile station 300 is visiting the pico-cell Cp, it will be understood that the mobile station 300 can perform radio communication with at least one of the pico base stations 200 defining the pico-cells Cp and the macro base station 100 defining the macro cell Cm that includes the pico-cells Cp.

The scheme for radio communication between each base station and each mobile station 300 may be freely chosen. For example, OFDMA (Orthogonal Frequency Division Multiple Access) may be adopted for downlink, whereas SC-FDMA (Single-Carrier Frequency Division Multiple Access) may be adopted for uplink.

(2) Structure of Mobile Station

Figure 2:
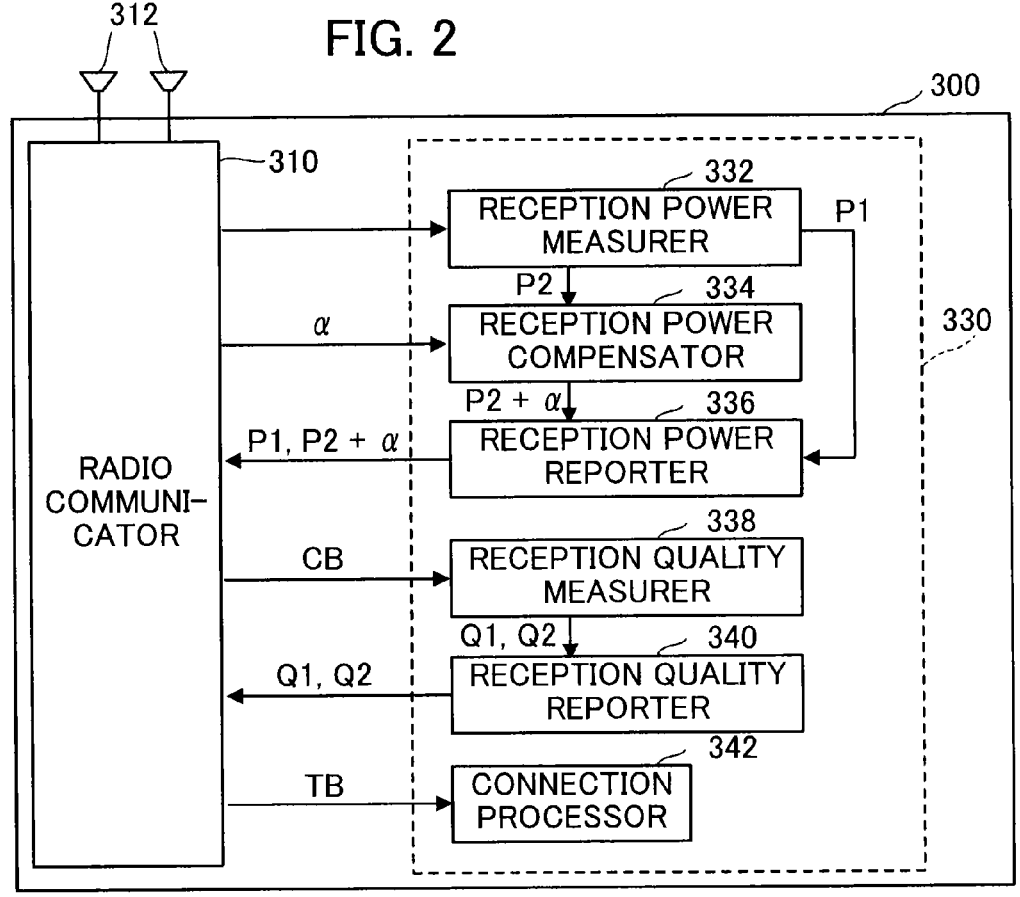
FIG. 2 is a block diagram showing the structure of a mobile station according to an embodiment of present invention.

FIG. 2 is a block diagram showing the structure of the mobile station 300 according to an embodiment of present invention. The mobile station 300 includes a radio communicator 310 and a controller 330. For the purpose of facilitating understanding, output devices for outputting sound, image, etc., and input devices for accepting user instructions are omitted in FIG. 2.

The radio communicator 310 is an element for executing radio communication with base stations (the macro base station 100 and the pico base stations 200), and includes transmission and reception antennas 312, a reception circuit for receiving radio signals (radio waves) from a base station and converting them to electrical signals, and a transmission circuit for converting electrical signals, such as a voice signal, to radio signals and sending them.

The controller 330 includes, as its elements, a reception power measurer 332, a reception power compensator 334, a reception power reporter 336, a reception quality measurer 338, a reception quality reporter 340, and a connection processor 342. Details of operations of the controller 330 will be described later. The controller 330 and the reception power measurer 332, the reception power compensator 334, the reception power reporter 336, the reception quality measurer 338, the reception quality reporter 340, and the connection processor 342 within the controller 330 are functional blocks accomplished by the fact that a CPU (central processing unit, not shown) in the mobile station 300 executes a computer program stored in a memory (not shown) and operates in accordance with the computer program.

(3) Structure of Macro Base Station

Figure 3:
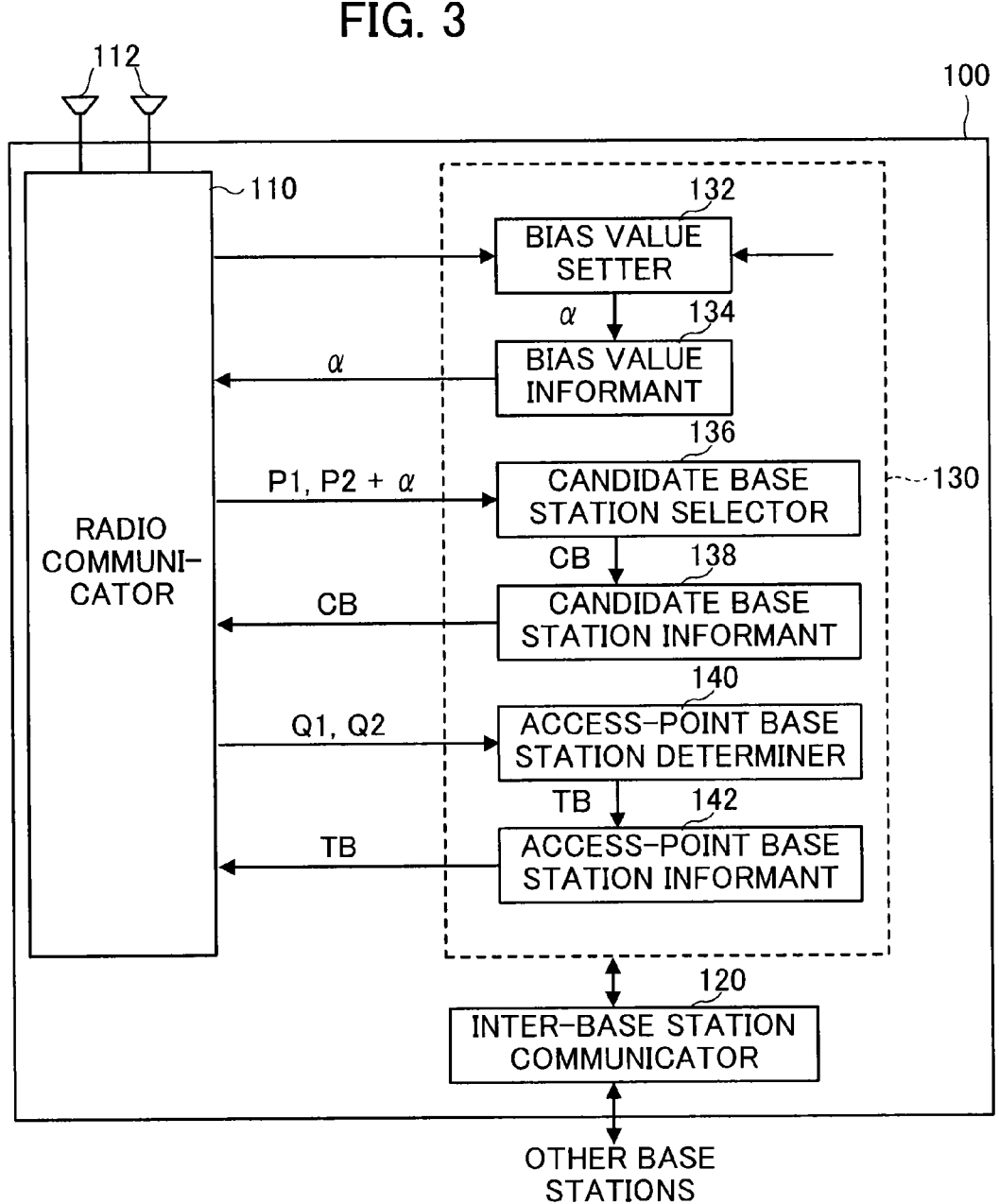
FIG. 3 is a block diagram showing the structure of a macro base station according to an embodiment of the present invention.

FIG. 3 is a block diagram showing the structure of the macro base station 100 according to an embodiment of the present invention. The macro base station 100 includes a radio communicator 110, an inter-base station communicator 120, and a controller 130.

The radio communicator 110 is an element for executing radio communication with mobile stations 300, and includes transmission and reception antennas 112, a reception circuit for receiving radio signals (radio waves) from mobile stations 300 and converting them to electrical signals, and a transmission circuit for converting electrical signals, such as a voice signal, to radio signals, and sending them.

The inter-base station communicator 120 is an element for executing communication with other base stations (other macro base stations 100 and the pico base stations 200), and exchanges electrical signals with other base stations via cable or radio.

The controller 130 includes, as its elements, a bias value setter 132, a bias value informant 134, a candidate base station selector 136, a candidate base station informant 138, an access-point base station determiner 140, and an access-point base station informant 142. Details of operations of the controller 130 will be described later.

The controller 130 and the bias value setter 132, the bias value informant 134, the candidate base station selector 136, the candidate base station informant 138, the access-point base station determiner 140, and the access-point base station informant 142 within the controller 130 are functional blocks accomplished by the fact that a CPU (not shown) in the macro base station 100 executes a computer program stored in a memory (not shown) and operates in accordance with the computer program.

(4) Structure of Pico Base Station

Figure 4:
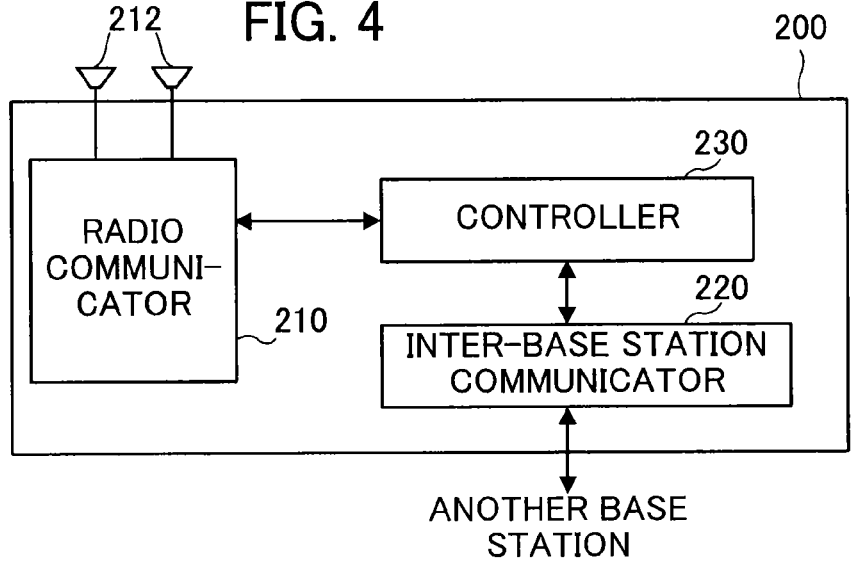
FIG. 4 is a block diagram showing the structure of a pico base station according to an embodiment of the present invention.

FIG. 4 is a block diagram showing the structure of the pico base station 200 according to an embodiment of the present invention. The pico base station 200 includes a radio communicator 210, an inter-base station communicator 220, and a controller 230. The pico base station 200 is an open-type base station that permits radio connection from any mobile stations 300.

The radio communicator 210 is an element for executing radio communication with mobile stations 300, and includes transmission and reception antennas 212, a reception circuit for receiving radio signals from mobile stations 300 and converting them to electrical signals, and a transmission circuit for converting electrical signals, such as a voice signal, to radio signals, and sending them.

The inter-base station communicator 220 is an element for executing communication with the macro base station 100 to which the pico base station 200 itself is connected, and exchanges electrical signals with the macro base station 100 via cable or radio.

The controller 230 is a functional block accomplished by the fact that a CPU (not shown) in the pico base station 200 executes a computer program stored in a memory (not shown) and operates in accordance with the computer program. Details of operations of the controller 230 will be described later.

The pico base station 200 can receive information items transmitted from the macro base station 100, and can forward them to the corresponding mobile station 300. More specifically, the controller 230 supplies, to the radio communicator 210, an electrical signal indicating information items received at the inter-base station communicator 220 of the pico base station 200 from the macro base station 100. The radio communicator 210 converts the supplied electrical signal to radio signals and sends them to the corresponding mobile station 300. In addition, the controller 230 supplies, to the inter-base station communicator 220, an electrical signal indicating information transmitted from a mobile station 300 and obtained by reception and conversion at the radio communicator 210 of the pico base station 200. The inter-base station communicator 220 transmits the supplied electrical signal to the macro base station 100. With such a structure, when the mobile station 300 is near the pico base station 200 and has difficulty in radio communication with the macro base station 100 (since interfering power from the pico base station 200 is high), necessary information can be exchanged between each mobile station 300 and the macro base station 100.

(5) Heterogeneous Network (HetNet)

Radio transmission capability (antenna gain, maximum transmission power, average transmission power, etc.) of the macro base station 100 is higher than that of pico base stations 200. In addition, the size (width, depth, and height) of the macro base station 100 is greater than that of the pico base station 200, and the elevation at which the transmission and reception antennas of the macro base station 100 are deployed is higher that that for pico base stations 200. Therefore, the macro base station 100 can perform wireless communication with a farther mobile station 300. Consequently, the macro cell Cm is larger than pico-cells Cp in area. For example, the radius of the macro cell Cm is from several hundred meters to several tens of kilometers, whereas the radius of the pico-cell Cp is from several meters to several tens of meters.

As will be understood from the above description, the macro base station 100 and the pico base station 200 in the radio communication system 1 constitute a heterogeneous network in which multiple types of radio base stations having different transmission powers (transmission capabilities) are deployed in a multi-layered way (for example, see 3GPP TR 36.814 V9.0.0 (2010-03), 3rd Generation Partnership Project; Technical Specification Group Radio Access Network; Evolved Universal Terrestrial Radio Access (E-UTRA); Further advancements for E-UTRA physical layer aspects (Release 9), in particular, Section 9A "Heterogeneous Deployments").

In the heterogeneous network, mobile stations 300 are connected (offloaded) to pico base stations 200 located in the macro cell Cm, so that concentration of wireless connection and traffic is restricted and frequency usage efficiency per unit area may be improved. It is preferable that pico base stations 200 be deployed in hot spots where traffic is concentrated (for example, railroad stations).

However, as described above, the size of pico-cells Cp defined by pico base stations 200 is small (radio capability of pico base stations 200 is low). Accordingly, in a structure in which the radio access point base station is selected on the basis of reception powers (Reference Signal Received Powers (RSRPs)) at the mobile station 300, many mobile stations 300 are connected to the macro base station 100 of which radio capability is higher. Accordingly, it is likely that the advantage of restricting concentration of wireless connection and traffic by offloading is limited.

(6) Cell Range Expansion (CRE)

Figure 5:
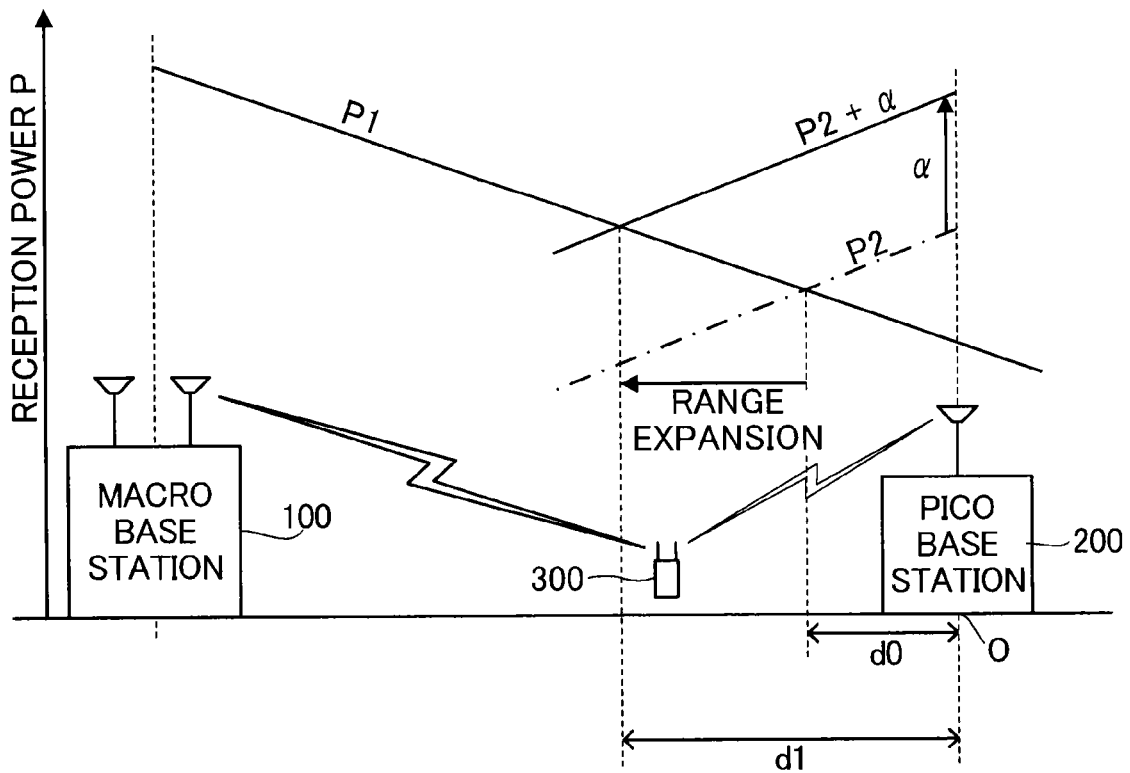
FIG. 5 is a view showing operations for offsetting reception power values in the radio communication system.

Accordingly, for the heterogeneous network, a technology called cell range expansion has been proposed. In the following, cell range expansion will be described with reference to FIGS. 5 to 7. FIG. 5 is a view showing an aspect of offsetting a reception power value by using a bias value $\alpha$. Hereinafter, let us assume that the reception power of a radio signal from the macro base station 100 measured by the mobile station 300 (reception power measurer 332) is a reception power value P1, whereas let us assume that the reception power of a radio signal from the pico base station 200 measured by the mobile station 300 (reception power measurer 332) is a reception power value P2. The bias value $\alpha$ is set by the bias value setter 132 and is transmitted from the bias value informant 134 to the mobile station 300. The scheme for setting the bias value $\alpha$ can be freely chosen. For example, it can be set depending on the traffic amount at the macro base station 100, the number of mobile stations 300 connected to the macro base station 100, etc.

The attenuation of radio signals (radio waves) from each of base stations (including macro base stations 100 and pico base stations 200) is large at a location of which the distance from the base station is long. Accordingly, the farther from the base station, the less each reception value (P1 or P2) is. When a mobile station 300 is located in an area in which the reception power value P1 of the radio signal from the macro base station 100 is in excess of the reception power value P2 of the radio signal from the pico base station 200, it is determined that the mobile station 300 should be connected to the macro base station 100. On the other hand, when the mobile station 300 is located in an area in which the reception power value P2 is in excess of the reception power value P1 (an area of which the distance from the center 0 of the pico base station 200 is within d0), it is determined that the mobile station 300 should be connected to the pico base station 200.

As described above, the radio capability of the pico base station 200 is relatively less than that of the macro base station 100, so that the area in which the reception power value P2 is in excess of the reception power value P1 is relatively small, as illustrated in FIG. 5. Accordingly, prior to determining the base station to which the mobile station 300 should be connected, the reception power compensator 334 of the mobile station 300 adds a bias value $\alpha$ to the reception power value P2 of the radio signal from the pico base station 200 of which radio capability is low. As a result, the area in which the reception power value P2 is in excess of the reception power value P1 (i.e., the range of the pico-cell Cp) is expanded from the area of which the distance from the center 0 of the pico base station 200 is within d0 to the area of which the distance from the center 0 of the pico base station 200 is within d1.

Figure 6:
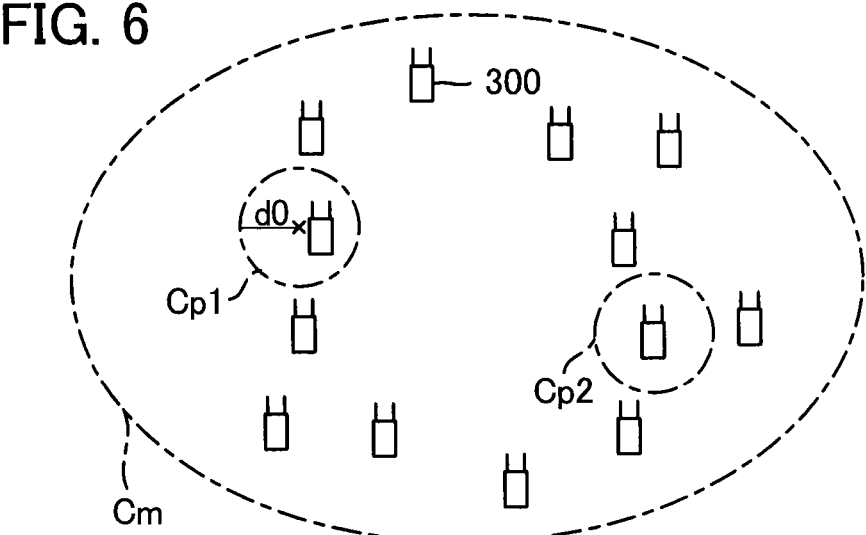
FIG. 6 is a view showing a situation before cell range expansion using the offsetting operation is executed.
Figure 7:
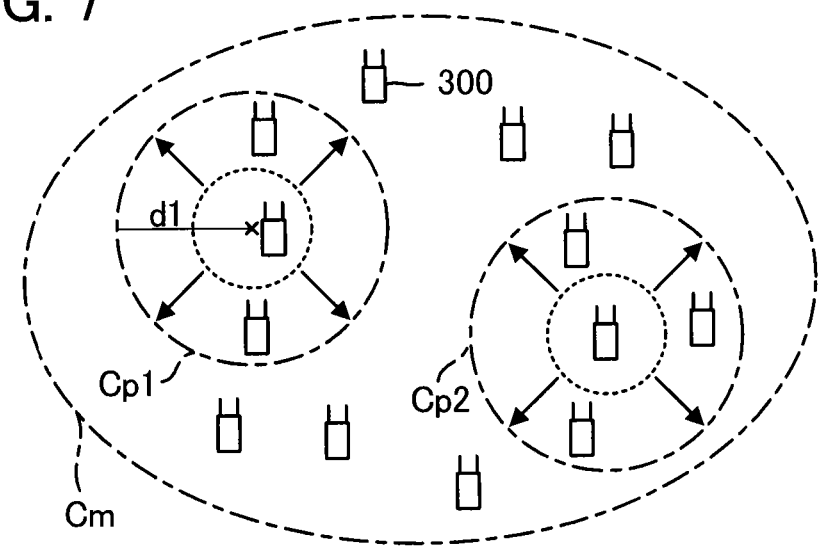
FIG. 7 is a view showing a situation after cell range expansion using the offsetting operation is executed.

FIG. 6 is a view showing a situation before the cell range expansion described with reference to FIG. 5 is executed, whereas FIG. 7 is a view showing a situation after the cell range expansion is executed. For the purpose of facilitating description, illustration of the macro base station 100 and the pico base stations 200 is omitted in FIGS. 6 and 7, but it will be appreciated that a base station (the macro base station 100 or a pico base station 200) is located at the center of each cell (the macro cell Cm or the pico-cell Cp). As shown in FIGS. 6 and 7, by virtue of the cell range expansion using the bias value $\alpha$, the radius of each pico-cell Cp1 or Cp2 is expanded from d0 to d1 (d1>d0), so that more mobile stations 300 become located in each pico-cell Cp1 or Cp2. In other words, by virtue of the cell range expansion, more mobile stations 300 become connected to the pico base stations 200 wirelessly.

The cell range expansion in the present embodiment is executed in the above-described manner. However, the bias value $\alpha$ is only used for increasing the reception power value P2 numerically, and the strength of the radio signal from the pico base station 200 at the mobile station 300 is not changed. Accordingly, there is a problem in that at the mobile station 300 connected to the pico base station 200 by cell range expansion (the mobile station 300 that would be connected to the macro base station 100 if offsetting by the bias value $\alpha$ is not performed), interference from the macro base station 100 is large.

(7) Inter-Cell Interference Coordination (ICIC)

Accordingly, for the heterogeneous network, a technology called inter-cell interference coordination has been proposed. In the inter-cell interference coordination, radio transmission from the macro base station 100 is stopped at partial radio resources (for example, in time domain or frequency domain), so that interference to the mobile station 300 connected wirelessly to the pico base station 200 is restrained.

Figure 8:
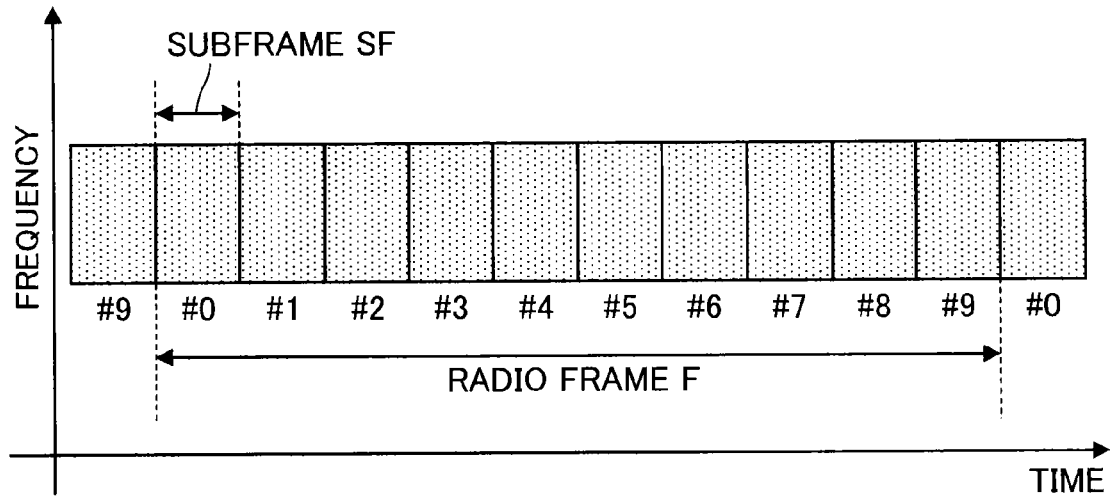
FIG. 8 is a view showing a format of the radio frame exchanged in the radio communication system.

FIG. 8 is a view showing a format of the radio frame F exchanged between communication elements in the radio communication system 1. The radio frame F is a communication unit of the radio signal exchanged between communication elements (the macro base station 100, the pico base stations 200, the mobile stations 300, etc.), and occupies a predetermined time length (for example, 10 milliseconds) and a predetermined frequency bandwidth (for example, 15 MHz width). A consecutive radio signal is constituted by transmitting radio frames F continually.

One radio frame F includes multiple subframes SF. A subframe SF is a communication unit occupying a time length (for example, 1 millisecond) shorter than that of the radio frame F. Each subframe SF includes multiple resource blocks RB (not shown). A resource block RB is a communication unit occupying a time length (for example, 0.5 milliseconds)

shorter than that of the subframe SF and a predetermined frequency bandwidth (for example, 180 kHz) narrower than that of the subframe SF.

Figure 9:
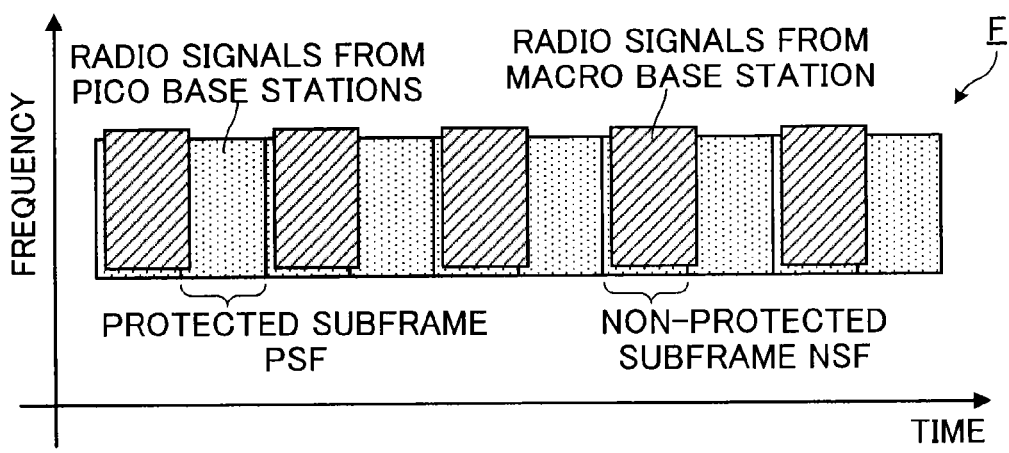
FIG. 9 is a view for describing inter-cell interference coordination in time domain according to an embodiment of the present invention.

FIG. 9 is a view for describing an example of inter-cell interference coordination in time domain. The parts containing oblique lines correspond to radio signals from the macro base station, whereas the parts containing dots correspond to radio signals from the pico base stations. The macro base station 100 and the pico base stations 200 send radio signals at common frequencies and common radio frame timing. The radio communicator 110 of the macro base station 100 can switch conducting and stopping transmission of radio signals at every subframe SF. On the other hand, the radio communicator 210 of the pico base station 200 continuously transmits radio signals to mobile stations 300.

The subframe SF at which the macro base station 100 stops transmission of radio signals are referred to as a "protected subframe PSF" since radio signals from the pico base stations 200 are protected from interference caused by radio signals from the macro base station 100. On the other hand, the subframe SF at which the macro base station 100 conducts transmission of radio signals are referred to as a "non-protected subframe NSF".

FIG. 9 shows an example in which protected subframes PSF and non-protected subframes NSF are alternated at each subframe SF, but it will be appreciated that protected subframes PSF and non-protected subframes NSF can be located freely in the time direction.

Figure 10:
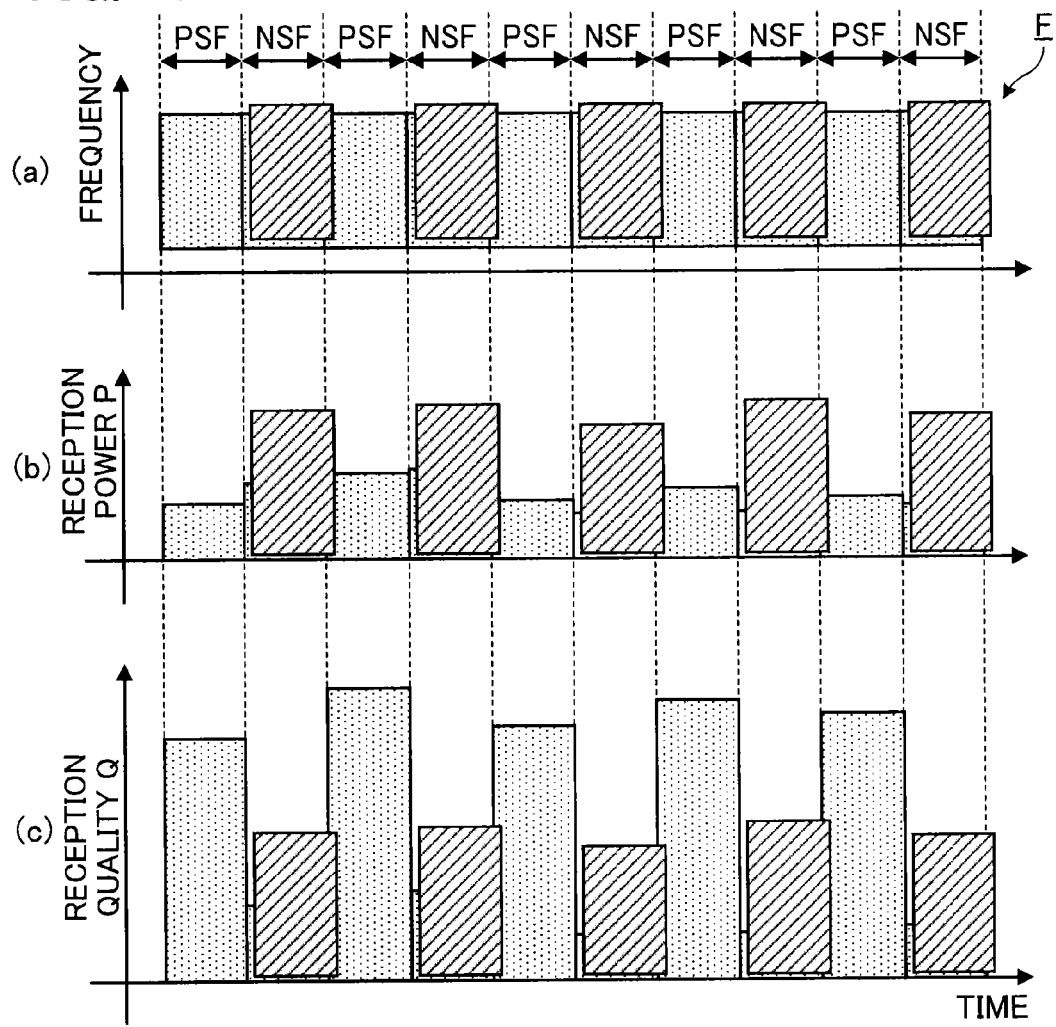
FIG. 10 is a view showing examples of reception powers and reception qualities of radio signals in a case in which the inter-cell interference coordination is applied.

FIG. 10 is a view showing examples of reception powers and reception qualities of radio signals at the mobile station 300 in a case in which the inter-cell interference coordination exemplified in FIG. 9 is applied. As a premise of FIG. 10, let us assume that the mobile station 300 is located at a place at which the reception power from the macro base station 100 is in excess of that from the pico base station 200 as described with reference to FIG. 5.

The value representing the reception quality may be a value, such as the SINR (Signal-to-Interference and Noise Ratio), indicating directly the reception quality, or a control parameter calculated on the basis of the reception quality and indicating a request to the base station (for example, the data rate requested from the user terminal UE to the base station). The rank number corresponding to the number of streams in Coordinated Multi-Point transmission and reception (CoMP), the precoding matrix indicator (PMI), etc. may be adopted as the value representing the reception quality. In the present embodiment, the SINR is used as an example.

Section (a) of FIG. 10 shows that transmission and stopping of radio signals from the macro base station 100 are repeated at each subframe SF. That is to say, it shows that protected subframes PSF and non-protected subframes NSF are alternated at each subframe SF.

Section (b) of FIG. 10 shows the reception power (indicated by oblique lines) of radio signals from the macro base station 100 at the mobile station 300 and the reception power (indicated by dots) of radio signals from the pico base station 200 at the mobile station 300. Since the propagation environment varies according to passage of time, the reception power of radio signals at the mobile station 300 also varies according to passage of time. In addition, as described above, at the protected subframes PSF, the macro base station 100 stops transmitting radio signals, so that the macro reception power is zero.

Section (c) of FIG. 10 shows the reception quality (indicated by oblique lines) of radio signals from the macro base station 100 at the mobile station 300 and the reception quality (indicated by dots) of radio signals from the pico base station 200 at the mobile station 300. At the protected subframes PSF, only the pico base station 200 transmits radio signals, so that there is no interference from radio signals sent by the macro base station 100, and thus, the reception quality of radio signals from the pico base station 200 is high. On the other hand, at the non-protected subframes NSF, radio signals from the macro base station 100 and radio signals from the pico base station 200 mutually interfere. Therefore, the reception quality of radio signals from both the macro base station 100 and the pico base station 200 at the non-protected subframes NSF is lower than the reception quality of radio signals from the pico base station at the protected subframes PSF. In addition, at the non-protected subframes NSF, the reception power from the macro base station 100 is higher than the reception power of the pico base station 200, so that the reception quality of radio signals from the macro base station 100 is better than the reception quality of radio signals from the pico base station 200.

As will be understood from the above description, in a case in which the inter-cell interference coordination is applied, if the reception powers of radio signals are used as criteria for selecting the radio access point base station (i.e., if the base station corresponding to radio signals having the higher reception power is used as the radio access point), it is not necessarily the case that the mobile station can enjoy better reception quality. In the example shown in FIG. 10, if the macro base station 100 sending radio signals having the higher reception power is selected as the radio access point (see Section (b) of FIG. 10), a lower reception quality is realized (see Section (c) of FIG. 10).

(8) Multistep Selection of Base Station

Accordingly, in the present embodiment, multiple base stations that are candidates for the radio access point are selected on the basis of reception powers, and the radio access point is decided from among the multiple candidate base stations on the basis of the reception qualities before wireless communication is actually executed.

Figure 11:
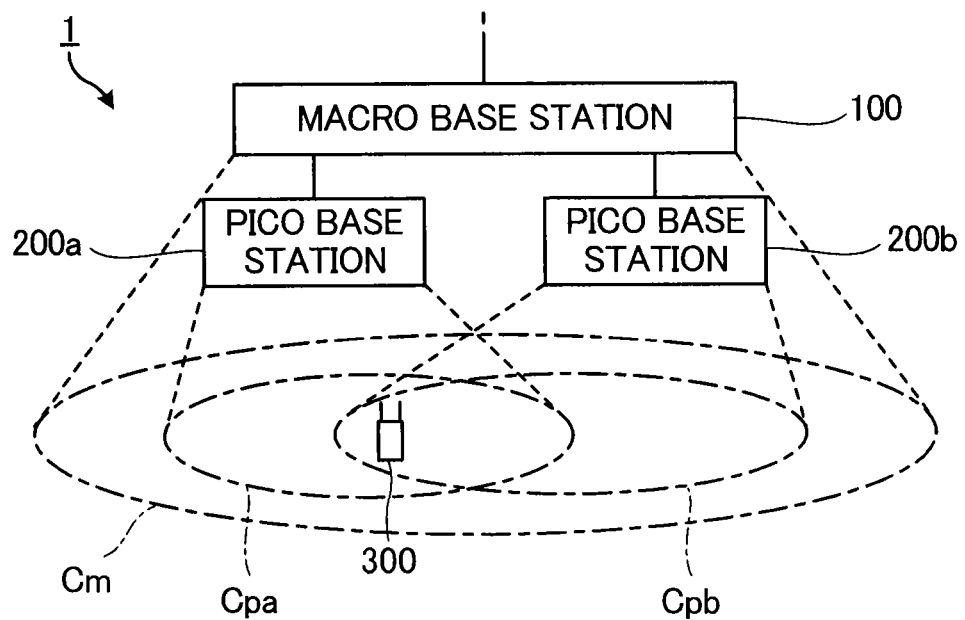
FIG. 11 is a block diagram showing a radio communication system according to an embodiment of the present invention.
Figure 12:
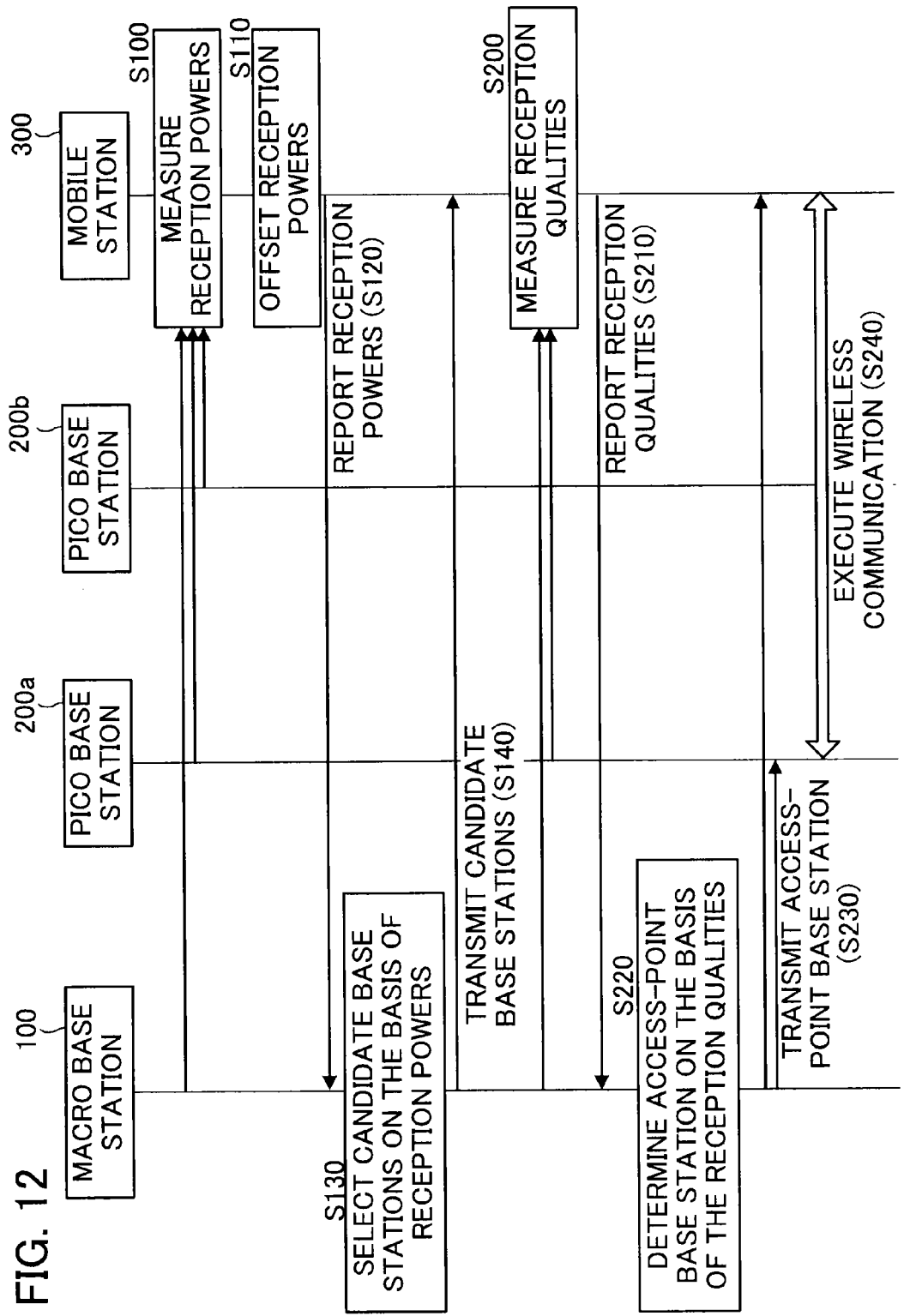
FIG. 12 is an operational flow diagram showing multistep selection of a base station according to an embodiment of the present invention.
Figure 13:
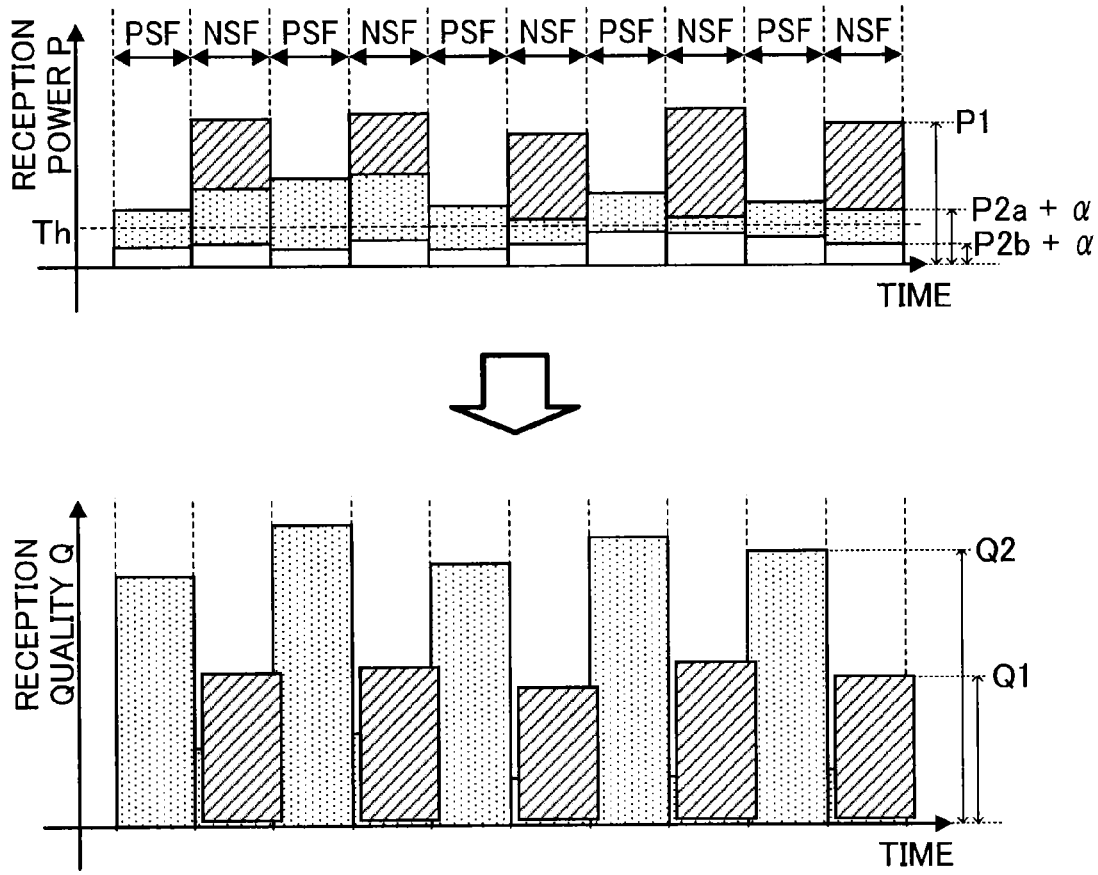
FIG. 13 is a view for describing a situation of the multistep selection of the base station.

With reference to FIGS. 11 to 13, multistep selection of the base station according to the present embodiment will be described. As shown in FIG. 11, two pico base stations 200a and 200b are connected to the macro base station 100, and form pico-cells Cpa and Cpb, respectively. The mobile station 300 is located within an area on which pico-cells Cpa and Cpb overlap.

FIG. 12 shows operation flow of the multistep selection of the base station according to the present embodiment. First, the reception power measurer 332 of the mobile station 300 measures reception powers of radio signals sent from the base stations (the macro base station 100 and the pico base stations 200a and 200b) and received at the radio communicator 310 to obtain reception power values P1, P2a, and P2b (step S100).

The reception power compensator 334 of the mobile station 300 offsets the reception power values P2a and P2b of radio signals from the pico base stations 200a and 200b by using a bias value α transmitted in advance from the bias value informant 134 of the macro base station 100. More specifically, the reception power compensator 334 adds the bias value α to the reception power values P2a and P2b of radio signals received from the pico base stations 200a and 200b to obtain offset reception power values P2a+α and P2b+α (step S110).

The reception power value P1 from the macro base station 100 is supplied from the reception power measurer 332 to the reception power reporter 336, whereas the offset reception power values P2a+α and P2b+α are supplied from the reception power compensator 334 to the reception power reporter 336. The reception power reporter 336 reports (transmits) the reception power values P1, P2a+α, P2b+α to the macro base station 100 (step S120).

On the basis of the reception power values P1, P2a+α, P2b+α reported from the reception power reporter 336 of the mobile station 300, the candidate base station selector 136 of the macro base station 100 selects candidate base stations that are candidates for the radio access point of the mobile station 300 (step S130). The scheme for selecting candidate base stations can be freely chosen. For example, one or more base stations corresponding to reception power values higher than a predetermined threshold may be selected as candidate base stations. Alternatively, in each type of base station (macro and pico), a single base station corresponding to the highest reception power may be selected. In the example of FIGS. 12 and 13, on the basis of a threshold Th, the candidate base station selector 136 selects the macro base station 100 and the pico base station 200a as candidate base stations.

Candidate base station information CB indicating the candidate base stations (the macro base station 100 and the pico base station 200a) is supplied from the candidate base station selector 136 to the candidate base station informant 138 and is then transmitted to the mobile station 300 via the radio communicator 110 (step S140). The reception quality measurer 338 of the mobile station 300 receives the candidate base station information CB via the radio communicator 310, and stores it in a memory (not shown).

Before executing data transmission (downlink communication) to the mobile station 300, the reception quality measurer 338 of the mobile station 300 measures the reception qualities of radio signals that are to be used for wireless communication with the candidate base stations (the macro base station 100 and the pico base station 200a) indicated by the candidate base station information CB (step S200). More specifically, the reception quality measurer 338 measures the reception quality of radio signals from the macro base station 100 at the non-protected subframes NSF to obtain a reception quality value Q1, and measures the reception quality of radio signals from the pico base station 200a at the protected subframes PSF to obtain a reception quality value Q2. In the example shown in FIG. 13, the reception quality value Q2 is higher than the reception quality value Q1 (Q2>Q1).

The reception quality values Q1 and Q2 are supplied from the reception quality measurer 338 to the reception quality reporter 340, and then are reported (transmitted) to the macro base station 100 via the radio communicator 310 (step S210). The scheme for reporting the reception quality values Q can be freely chosen. For example, the reception quality reporter 340 may average each reception quality value Q measured by the reception quality measurer 338 over a predetermined period, and may report the averaged value to the macro base station 100 at a predetermined cycle. Alternatively, whenever the reception quality measurer 338 measures the reception quality value Q, the reception quality reporter 340 may report the measured reception quality value Q to the macro base station 100.

The access-point base station determiner 140 of the macro base station 100 determines the base station that actually executes downlink communication to the mobile station 300 (transmission source of radio signals to the mobile station 300) on the basis of the multiple reception quality values Q1 and Q2 reported from the reception quality reporter 340 of the mobile station 300 (step S220). More specifically, the access-point base station determiner 140 determines, as the access-point base station that is the radio access point for the mobile station 300, a base station corresponding to the higher reception quality value Q (better reception quality) among the reception quality value Q2 measured by the reception quality measurer 338 at the protected subframes PSF and the reception quality value Q1 measured by the reception quality measurer 338 at the non-protected subframes NSF. As described above, the reception quality value Q2 is higher than the reception quality value Q1, so that the access-point base station determiner 140 determines the pico base station 200a corresponding to the reception quality value Q2 as the access-point base station for the mobile station 300.

Access-point base station information TB indicating the access-point base station (the pico base station 200a) is supplied from the access-point base station determiner 140 to the access-point base station informant 142, and then is transmitted to the pico base station 200a and the mobile station 300 via the inter-base station communicators 120 and the radio communicator 110 (step S230). As a result, the pico base station 200a that is decided as the access-point base station and the mobile station 300 execute wireless communication (step S240).

Candidate base stations that are candidates for the radio access point of the mobile station 300 are selected by the above-described steps S100 to S140, and the access-point base station that is the actual radio access point for the mobile station 300 is determined by the above-described steps S200 to S240.

All actions (steps S100 to S240) have been described as a sequence for simplifying description, but the set of steps S100 to S140 and the set of steps S200 to S240 can be executed at an optimal time, respectively. In particular, it is preferable that the actions of steps S100 to S140 be executed at the stage of cell search or handover of the mobile station 300, whereas it preferable that the actions of steps S200 to S240 be executed at occurrence of radio transmission (downlink wireless communication) to the mobile station 300.

(9) Advantages of Present Embodiment

According to the embodiment described above, multiple candidate base stations are selected on the basis of reception powers (reception power values P) at the mobile station, and before actual wireless communication is executed, a base station corresponding to the better reception quality (reception quality value Q) at the mobile station 300 can be determined as the access-point base station for executing wireless communication among the candidate base stations. Therefore, in comparison with another structure in which the access-point base station is determined simply on the basis of reception power values P, it is possible to select (determine) a more appropriate base station (that will result in better reception quality) as the radio access point. In addition, the determination of the access-point base station is conducted on the basis of reception qualities before actual wireless communication is executed. Therefore, in comparison with another structure in which reception qualities are always measured and reported, the number of times of measurements and reports of reception qualities at the mobile station 300 can be reduced, and power consumption of the mobile station can be limited.

Modifications

Various modifications may be applied to the above-described embodiment. Specific modifications are exemplified below. Two or more modifications selected from among the following may be combined.

(1) Modification 1

Figure 14:
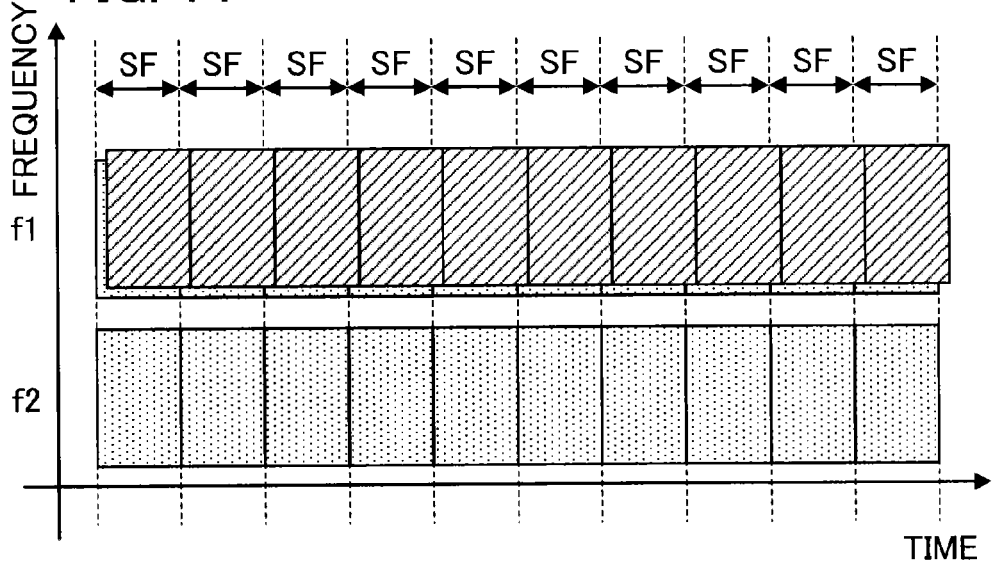
FIG. 14 is a view for describing inter-cell interference coordination in frequency domain according to a variation of the present invention.

In the above-described embodiment, the radio communication system 1 adopts inter-cell interference coordination in a time domain, but inter-cell interference coordination in a frequency domain may be adopted in the radio communication system 1. More specifically, in a structure in which the macro base station 100 and the pico base stations 200 send radio signals at a frequency band f1 whereas only the pico base stations 200 send radio signals at a frequency band f2 that is different from the frequency band f1 as shown in FIG. 14, the idea of the above-described embodiment can be used. The frequency band f1 is the non-protected resource, whereas the frequency band f2 is the protected resource. In this variation, multiple candidate base stations are selected on the basis of the reception power values P at the mobile station 300, and the reception quality value Q at each frequency band f1 or f2 are measured and obtained before execution of actual wireless communication. Then, the base station corresponding to the best reception quality value Q is determined as the access-point base station, and then wireless communication is executed.

(2) Modification 2

In the above-described embodiment, the macro base station 100 selects the candidate base stations for access points of the mobile station 300 and determines the actual access-point base station, but selection of candidate base stations and determination of the access-point base station may be executed at any place of the radio communication system 1. For example, each mobile station 300 may include the candidate base station selector and the access-point base station determiner, so that the mobile station 300 may select candidate base stations and determine the access-point base station. Alternatively, the pico base station 200 may include the candidate base station selector and the access-point base station determiner, so that the pico base station 200 may select candidate base stations and determine the access-point base station. Furthermore, two or more elements in the radio communication system 1 (for example, the macro base station 100 and the pico base stations 200) may cooperate to select candidate base stations and to determine the access-point base station.

(3) Modification 3

In the above-described embodiment, candidate base stations are selected on the basis of reception powers (RSRPs), and the actual radio access point base station is decided on the basis of the reception qualities in downlink wireless communication. However, the actual radio access point base station (in particular, uplink destination base station) may be decided on the basis of the reception qualities in uplink wireless communication.

(4) Modification 4

In the above-described embodiment, the reception quality reporter 340 of the mobile station 300 reports the reception quality values Q to the macro base station 100. However, the reception quality reporter 340 may report the reception quality values Q to the base station corresponding to the best reception power value P or the best reception quality value Q. Alternatively, the reception quality reporter 340 may report the reception quality values Q to all base stations to which the mobile station 300 may communicate wirelessly. Alternatively, the reception quality values Q reported to a base station may be provided to other base stations via the inter-base station communicators 120 and 220.

(5) Modification 5

In the above-described embodiment, in operation of cell range expansion, the bias value $\alpha$ is added to the reception power values and offset reception power values $P+\alpha$ are calculated. However, in a case in which the reception power values P are represented in a ratio, the bias value $\alpha$ may be multiplied by the reception power values P to calculate the offset reception power values $P*\alpha$. In a case in which the reception power values P are represented in dB (logarithm of a ratio), the offset reception power values may be calculated by adding the bias value $\alpha$ (represented in dB) to the reception power values P (represented in dB). It will be understood that this is one type of the cases in which the bias value $\alpha$ is multiplied by the reception power values P.

(6) Modification 6

In the above-described embodiment, the pico base stations 200 are exemplified as radio base stations of which radio capability is lower than that of the macro base station 100. However, as radio base stations with lower radio capabilities, micro base stations, nano base stations, femto base stations, remote radio heads, etc., may be used. In addition, as elements of the radio communication system 1, a set of multiple types of radio base stations (e.g., macro base stations, pico base stations, and femto base stations) having different radio capabilities may be adopted.

(7) Modification 7

The mobile stations 300 may be any type of device that can perform radio communication with each of the radio base stations (the macro base station 100 and the pico base stations 200). The mobile station 300 may be a cell phone terminal, e.g., a feature phone or a smart phone, a desk-top type personal computer, a laptop personal computer, a UMPC (ultra-mobile personal computer), a portable game machine, or another radio terminal.

(8) Modification 8

In each of elements in the radio communication system 1 (the macro base station 100, the pico base stations 200, and the mobile stations 300), functions executed by the CPU may be executed by hardware or a programmable logic device, such as an FPGA (Field Programmable Gate Array) or a DSP (Digital Signal Processor), instead of the CPU.

REFERENCE SYMBOLS

1: Radio Communication System
100: Macro Base Station
110: Radio Communicator
112: Transmission And Reception Antennas
120: Inter-base Station Communicator
130: Controller
132: Bias Value Setter
134: Bias Value Informant
136: Candidate Base Station Selector
138: Candidate Base Station Informant
140: Access-Point Base Station Determiner
142: Access-Point Base Station Informant
200: Pico Base Station
210: Radio Communicator
212: Transmission And Reception Antennas
220: Inter-base Station Communicator
230: Controller
300: Mobile Station
310: Radio Communicator
312: Transmission And Reception Antennas
330: Controller
332: Reception Power Measurer
334: Reception Power Compensator
336: Reception Power Reporter
338: Reception Quality Measurer
340: Reception Quality Reporter
342: Connection Processor
CB: Candidate Base Station Information
Cm: Macro Cell
Cp: Pico-Cell
f (f1, f2): Frequency Band
F: Radio Frame
NSF: Non-protected Subframe PSF: Protected Subframe
P (P1, P2): Reception Power Value
Q (Q1, Q2): Reception Power Value
RB: Resource Block
SF: Subframe
TB: Access-point Base Station Information
Th: Threshold

The invention claimed is:

1. A radio communication system comprising:
multiple base stations including at least one first base station and at least one second base station of which radio capability is less than that of the first base station;
at least one mobile station that executes wireless communication by using at least one of a protected resource in which only the second base station transmits radio signals and a non-protected resource in which both the first base station and the second base station transmit radio signals;
a candidate base station selector configured to select candidate base stations that are candidates for a radio access point for the mobile station; and
an access-point base station determiner configured to determine an access-point base station that is an actual radio access point for the mobile station,
the mobile station comprising:
a reception power measurer configured to measure reception powers of radio signals received from the multiple base stations;
a reception power reporter configured to report the reception powers measured by the reception power measurer to the candidate base station selector,
wherein the candidate base station selector is capable of selecting multiple candidate base stations that are candidates for a radio access point for the mobile station on the basis of the reception powers reported by the reception power reporter of the mobile station,
the mobile station further comprising:
a reception quality measurer configured to, before the mobile station actually executes wireless communication with one of the candidate base stations, measure reception qualities of radio signals that are to be used for communication with the multiple candidate base stations selected by the candidate base station selector; and
a reception quality reporter configured to report the reception qualities measured by the reception quality measurer to the access-point base station determiner,
wherein the access-point base station determiner is configured to determine, as the access-point base station that is the radio access point for the mobile station, a base station corresponding to a best reception quality among the reception qualities of the radio signal used for communication between the second base station and the mobile station in the protected resource measured by the reception quality measurer of the mobile station and the reception quality of the radio signal used for communication between the first base station and the mobile station in the non-protected resource measured by the reception quality measurer of the mobile station.

2. The radio communication system according to claim 1, wherein the first base station further comprises:
a bias value setter configured to set a bias value for the mobile station; and
a bias value informant configured to transmit the bias value to the mobile station,
wherein the mobile station further comprises:
a reception power compensator configured to offset the reception power of the radio signal received from the second base station measured by the reception power measurer by increasing the reception power by using the bias value transmitted by the bias value informant of the first base station, and
wherein the reception power reporter is configured to report, to the candidate base station selector, the reception power offset by the reception power compensator as the reception power from the second base station.

3. The radio communication system according to claim 1, wherein
the first base station comprises:
said candidate base station selector;
a candidate base station informant configured to transmit information indicating the multiple candidate base stations selected by the candidate base station selector to the mobile station;
said access-point base station determiner; and
an access-point base station informant configured to transmit information indicating the access-point base station determined by the access-point base station determiner to the mobile station, and
wherein the reception quality reporter of the mobile station is configured to average the reception qualities of radio signals from the first base station for a predetermined period, is configured to average the reception qualities of radio signals from the second base station for the predetermined period, and is configured to report the averaged reception qualities to the access-point base station determiner of the first base station at a predetermined cycle.

4. A mobile station in a radio communication system, comprising:
multiple base stations including at least one first base station and at least one second base station of which radio capability is less than that of the first base station;
at least one mobile station that executes wireless communication by using at least one of a protected resource in which only the second base station transmits radio signals and a non-protected resource in which both the first base station and the second base station transmit radio signals;
a candidate base station selector configured to select candidate base stations that are candidates for a radio access point for the mobile station; and
an access-point base station determiner configured to determine an access-point base station that is an actual radio access point for the mobile station,
the mobile station comprising:
a reception power measurer configured to measure reception powers of radio signals received from the multiple base stations;
a reception power reporter configured to report the reception powers measured by the reception power measurer to the candidate base station selector;
a reception quality measurer configured to, before the mobile station actually executes wireless communication with one of the candidate base stations, measure reception qualities of radio signals that are to be used for communication with the multiple candidate base stations selected by the candidate base station selector;
a reception quality reporter configured to report the reception qualities measured by the reception quality measurer to the access-point base station determiner; and
said access-point base station determiner configured to determine, as the access-point base station that is the radio access point for the mobile station, a base station corresponding to a best reception quality among the reception qualities of the radio signal used for communication between the second base station and the mobile station in the protected resource measured by the reception quality measurer of the mobile station and the reception quality of the radio signal used for communication between the first base station and the mobile station in the non-protected resource measured by the reception quality measurer of the mobile station.

5. The mobile station according to claim 4, further comprising:
a reception power compensator configured to offset the reception power of the radio signal received from the second base station measured by the reception power measurer by increasing the reception power by using a bias value transmitted by the base station,
wherein the reception power reporter is configured to report, to the candidate base station selector, the reception power offset by the reception power compensator as the reception power from the second base station.

6. A base station in a radio communication system comprising:
multiple base stations including at least one first base station and at least one second base station of which radio capability is less than that of the first base station; and
at least one mobile station that executes wireless communication by using at least one of a protected resource in which only the second base station transmits radio signals and a non-protected resource in which both the first base station and the second base station transmit radio signals,
the base station comprising:
a candidate base station selector configured to select multiple candidate base stations that are candidates for a radio access point for the mobile station on the basis of reception powers of radio signals received by the mobile station from the multiple base stations and reported by the mobile station; and
an access-point base station determiner configured to, before the base station actually executes wireless communication with the mobile station, determine a base station corresponding to a best reception quality among the reception qualities of the radio signal that is to be used for communication between the second base station and the mobile station in the protected resource measured by the mobile station and the reception quality of the radio signal that is to be used for communication between the first base station and the mobile station in the non-protected resource measured by the mobile station, as an access-point base station that is an actual radio access point for the mobile station.

7. The base station according to claim 6, further comprising:
a bias value setter configured to set a bias value, the bias value being to be used by the mobile station for offsetting to increase the reception power of the radio signal received from the second base station measured by the mobile station; and
a bias value informant configured to transmit the bias value to the mobile station.

8. A communication control method used in a radio communication system, comprising:
multiple base stations including at least one first base station and at least one second base station of which radio capability is less than that of the first base station; and
at least one mobile station that executes wireless communication by using at least one of a protected resource in which only the second base station transmits radio signals and a non-protected resource in which both the first base station and the second base station transmit radio signals,
the communication control method comprising:
measuring, at the mobile station, reception powers of radio signals received from the multiple base stations;
reporting, from the mobile station, the reception powers measured by the mobile station to a candidate base station selector;
selecting, at the candidate base station selector, multiple candidate base stations that are candidates for a radio access point for the mobile station on the basis of the reception powers reported by the mobile station;
measuring, at the mobile station, reception qualities of radio signals that are to be used for communication with the multiple candidate base stations selected by the candidate base station selector before the mobile station actually executes wireless communication with one of the candidate base stations;
reporting, at the mobile station, the reception qualities measured by the mobile station to an access-point base station determiner; and
determining, at the access-point base station determiner, as the access-point base station that is an actual radio access point for the mobile station, a base station corresponding to a best reception quality among the reception qualities of the radio signal used for communication between the second base station and the mobile station in the protected resource measured by the mobile station and the reception quality of the radio signal used for communication between the first base station and the mobile station in the non-protected resource measured by the mobile station.

9. The communication control method according to claim 8, further comprising:
setting, at the base station, a bias value for the mobile station;
transmitting, from the base station, the bias value to the mobile station;
offsetting, at the mobile station, the reception power of the radio signal received from the second base station measured by the mobile station by increasing the reception power by using the bias value transmitted from the base station; and
reporting from the mobile station to the candidate base station selector, the reception power offset by the mobile station as the reception power from the second base station.

* * * * *